Sept. 15, 1959  E. WESTFORD  2,903,823
HYACINTH STAKE
Filed Jan. 13, 1958

INVENTOR.
Einar Westford.

Mason & Mason
ATTORNEYS.

2,903,823
HYACINTH STAKE

Einar Westford, Newport, Pa.

Application January 13, 1958, Serial No. 708,416

2 Claims. (Cl. 47—47)

This invention relates to a stake that may be driven into the ground for supporting growing plants, shrubs and other vegetation regardless as to whether they are grown in flower pots or in the ground, or whether grown indoors or outdoors.

A principal object is to provide a support or stake that may be driven into the soil for supporting the stalk or trunk of a growing plant or tree, which is adjustable whereby as the plant or tree grows in an upward direction, the supporting members of the stake may be adjusted accordingly.

Another object is the provision of a stake having adjustable parts, the stake and the parts being composed of stamped or readily moldable material, or by other known means whereby large quantities can be cheaply and easily manufactured.

Other objects will appear hereinafter throughout the specification.

Figure 1:
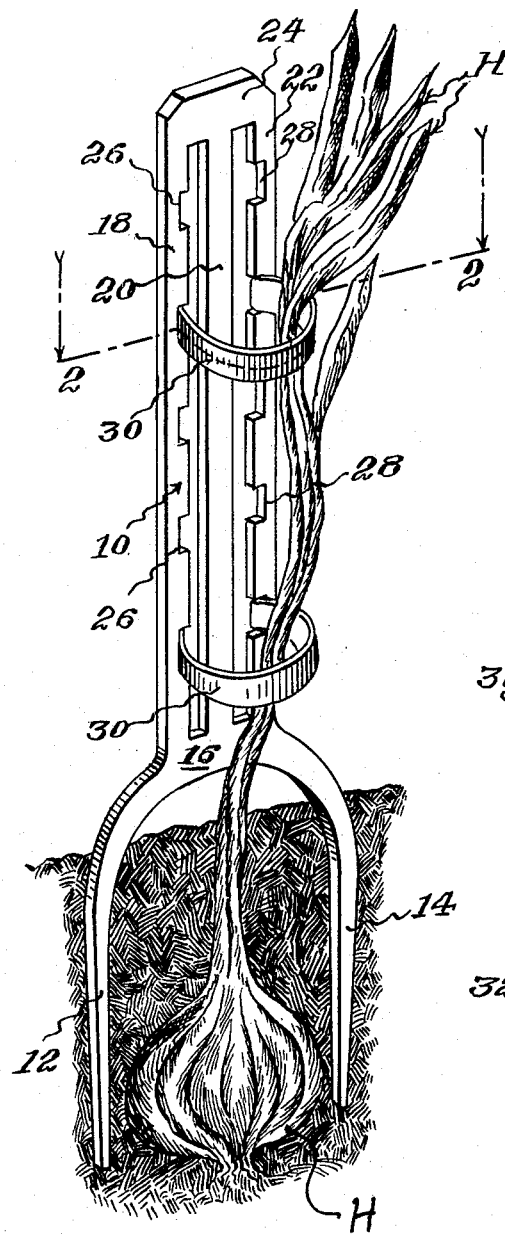
Figure 1 is a side elevational view of the stake of this invention shown as supporting a growing plant.

The stake and its supports may be composed entirely or partially from a number of different materials, such as plastic material, wood, metal, cardboard, or any other suitable material. Preferably the stake proper may be made of plastic material or of aluminum and the adjustable holders may be made of plastic material.

Referring to the drawings 10 indicates the stake as a whole. The stake is usually provided with one or more sharpened ends or legs 12 and 14, two being used for the purpose of illustration in Figure 1. Whether one or a plurality of ends 12 and 14 are used, such end should be offset from the longitudinal axis of the stake so as not to interfere with the bulb end of the growing plant shown at H in Figure 1.

The stake is provided with a base 16 and extending upwardly therefrom are a plurality of arms 18, 20 and 22. These arms are joined by an integral end member or cap 24.

It will be appreciated that the arm 20 has been provided solely for strengthening purposes, and that it may be omitted should the stake be composed of metal for instance, or should the arms 18 and 22 be thickened.

Figure 3:
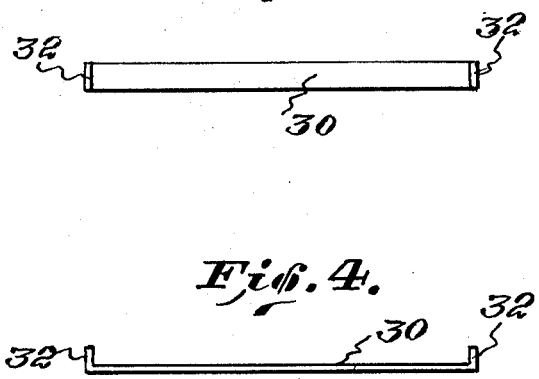
Figure 3 is a front elevation of one of the adjustable supports.
Figure 4:
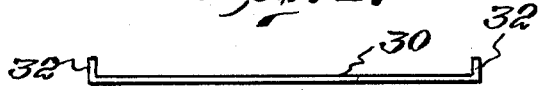
Figure 4 is a side elevation of the support shown in Figure 3.

Vertically spaced from each other are a plurality of supporting means such as notches indicated at 26 on arm 18, and 28 on arm 22. Each notch 26 is horizontally spaced from a notch 28 when the stake is in upright position. Pairs of apertures in place of the pairs of notches could be used, in which case a single slab would be used in place of the arms 18, 20 and 22. They support bands 30 of spring material. Each band ordinarily is straight or flat as shown in Figures 3 and 4 and is provided with turned ends or shoulders 32.

Figure 2:
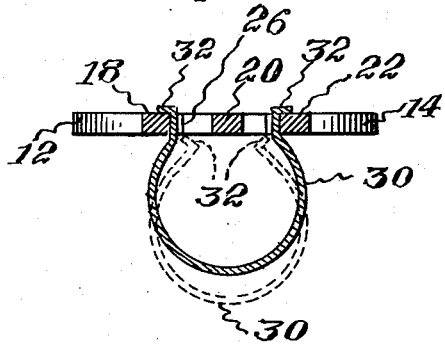
Figure 2 is a section on the line 2—2 of Figure 1.

In order to engage a band with a pair of parallel notches the band, which is preferably composed of thin colored plastic material, is bent by the fingers to the dotted line position of Figure 2. It is then slid into position opposite a pair of parallel notches 26, 28, and released whereby the resiliency of the band will expand it into engagement with the notches as shown in Figures 1 and 2.

After a few days, assuming the plant has grown, the bands are removed from their engagement with one pair of notches by applying inward pressure on opposite sides of the band, until the dotted line position of Figure 2 is attained, then the band is moved upwardly until another pair of notches is reached. Release of pressure will permit the sides of the band to engage a higher pair of notches.

It will be understood that the stem as the plant grows upwardly seats in the space between the arms 18 and 22, and may further be supported by the central arm 20. When the supporting bands are pulled against the stem, due to the fact that the arms are constructed of a material which is flexible, said arms may become slightly bowed.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A support for a growing hyacinth plant comprising a ground supporting means comprising spaced sharpened ends adapted to straddle a bulb when said ends are forced into the ground, arm means extending upwardly from said ground supporting means, a plurality of spaced pairs of opening means on said arm means, and spring band means for supporting a plant being adapted to removably engage a pair of said opening means, said spring band means being in strip form, said arm means comprising a plurality of parallel arms, and said opening means comprising notches on said parallel arms, each notch on one arm facing a corresponding notch on the other arm, and a spaced strengthening arm parallel with said first-mentioned arms and located in spaced relationship between the same, said pair of parallel arms and said spaced strengthening arm being co-planar and flexible and providing a pair of spaced vertical slots when said support is set up in vertical position with its ends in ground-engaging position, all three of said arms being integrally joined to each other adjacent the top portion of said support, and at the bottom portion below the slots and between them and the ground-supporting means, each notch extending into one of said slots and facing a notch in the other slot, the stem of the plant being located wholly within the space defined by the slots and the spaced strengthening arm, with the latter backing said stem.

2. The structure of claim 1 wherein said support and said spring band means are composed of plastic material, said arms being relatively thin in cross section.

References Cited in the file of this patent

UNITED STATES PATENTS

| | | |
|---|---|---|
| 1,336,580 | Parr | Apr. 13, 1920 |
| 1,594,195 | Henderson | July 27, 1926 |
| 1,628,249 | Kirfman | May 10, 1927 |
| 1,758,839 | Kelsey | May 13, 1930 |
| 1,771,207 | Coscioni | July 22, 1930 |

FOREIGN PATENTS

| | | |
|---|---|---|
| 15,605 | Great Britain | Aug. 19, 1895 |
| 613,721 | Great Britain | Dec. 2, 1948 |